United States Patent [19]

Howarth, Jr.

[11] 4,079,953
[45] Mar. 21, 1978

[54] ICE RESCUE CRAFT

[76] Inventor: William F. Howarth, Jr., 8 E. Dracut St., Methuen, Mass. 01844

[21] Appl. No.: 675,214

[22] Filed: Apr. 8, 1976

[51] Int. Cl.$^2$ ............................................. B62B 13/16
[52] U.S. Cl. ......................................... 280/19; 9/14; 280/20; D12/10
[58] Field of Search ...................... 280/12 R, 12.1, 18, 280/19, 20; 9/14, 2 F; 114/43, 123, 180; D12/10

[56] References Cited

U.S. PATENT DOCUMENTS

| 2,494,804 | 1/1950 | Gabriel | 114/123 |
| 2,994,291 | 8/1961 | Angell | 114/180 X |
| 3,139,057 | 6/1964 | Black | 114/43 |
| 3,532,066 | 10/1970 | Clemans | 114/43 |
| 3,799,566 | 3/1974 | Thompson | 280/18 |
| 3,912,290 | 10/1975 | Rich | 280/19 X |

Primary Examiner—Joseph F. Peters, Jr.
Assistant Examiner—Michael J. Forman
Attorney, Agent, or Firm—Pearson & Pearson

[57] ABSTRACT

An elongated, narrow, buoyant, ice rescue craft having a flat, planar, hard bottom, upwardly inclined forward and rearward end walls, upstanding side walls and a full length, flat, planar, top deck of hard material is formed of two identical half sections piano hinge pivoted to each other transversely of the center of the top deck and having releasable latches to retain it in extended position or in over folded condition for storage in the trunk of an automobile. A recess is provided in each opposite end of the top deck, each containing a coil of recovery line having an end affixed to the adjacent end wall. Outriggers may also be provided.

2 Claims, 7 Drawing Figures

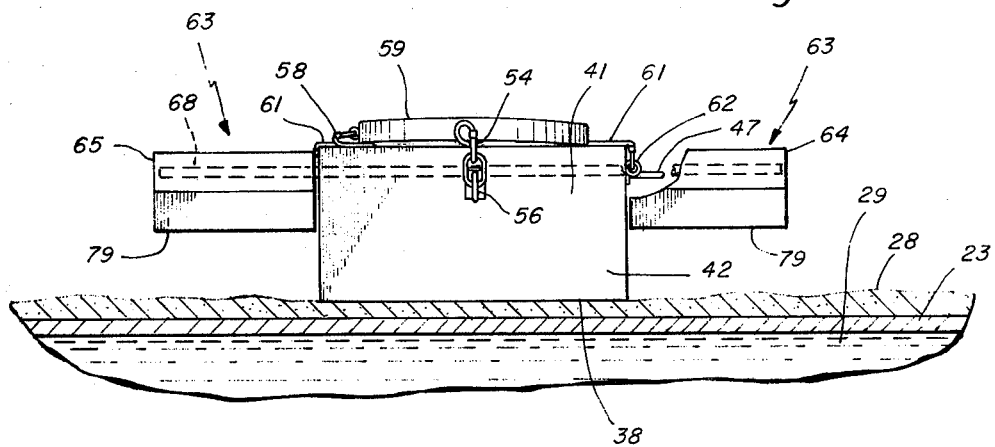
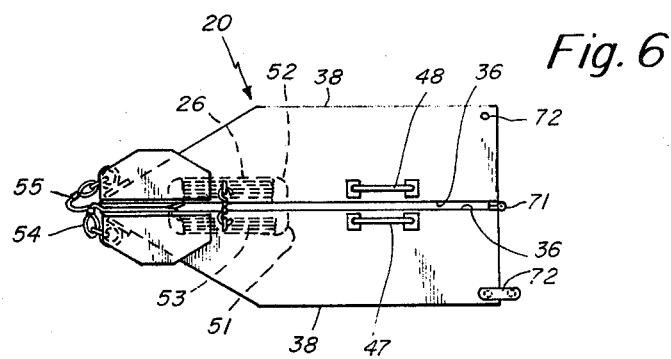
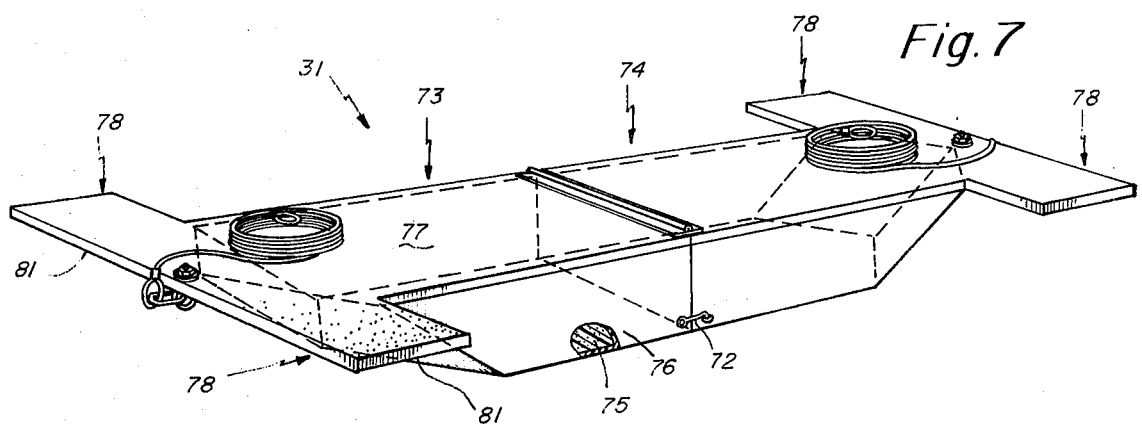

ial to Dixon of Feb. 20, 1940; U.S. Pat.
ICE RESCUE CRAFT

BACKGROUND OF THE INVENTION

It has heretofore been proposed to provide elongated, inflatable pneumatic structures such as life rafts, boats, or toboggans, the structures having no frames of rigid material and usually having relatively soft, rounded top and bottom faces. Such devices are disclosed in U.S. Pat. No. 2,191,374 to Dixon of Feb. 20, 1940; U.S. Pat. No. 3,432,182 to Solipasso of Mar. 11, 1969, and U.S. Pat. No. 3,694,836 to Serra of Oct. 3, 1972. It has been found that inflatable mattress type devices are not practical for ice rescue craft in northern climates, for the reason that the rubber bottoms are rounded and do not spread the weight sufficiently. They tend to tear and deflate on sharp ice, tin cans, broken bottles and the like and the soft rubber tops permit prone adults to roll off especially if the device is yieldably supported in water.

Another line of buoyant floats or boats proposes to enclose an inflatable loop body in a frame of rigid material, the craft being wide enough to accomodate a sitting person. While probably stable in water, these boats occupy too much storage space, and present a soft, bottom face to ice and snow which precludes its rapid advance. In U.S. Pat. No. 1,884,705 to Hoffman of Oct. 25, 1932, and U.S. Pat. No. 1,927,124 to Jones of Sept. 19, 1933 the inflatable boat, or float, has a soft fabric bottom which might tear on sharp ice or on broken bottles, tin cans, etc. caught in ice.

Life saving apparatus of the non-inflatable type is disclosed in U.S. Pat. No. 2,050,138 to Walters of Aug. 4, 1936, the bouyant member having rope handles therearound but being triangular in cross section with one side down and the other two sides being inclined and incapable of supporting a prone adult. A parallelogram, and square, shaped body is also disclosed in this patent. Similarly a buoyant cruise board of rigid material is taught in U.S. Pat. Des. No. 157,564, Byerly of Mar. 7, 1950, the board tapering in depth and width from front to rear.

An elongated buoyant ice rescue craft, about 12 feet long, is disclosed in U.S. Pat. No. 3,532,066 to Clemans of Oct. 6, 1970, the top deck being cross-slatted, exposing the foam material at the ends and there being no provision for housing of the recovery lines or for compact storage of the craft.

SUMMARY OF THE INVENTION

In this invention the storage advantages of a collapsible, inflatable rubber craft have been compared to the disadvantages of time lag for inflation, possible undesired deflation and the likelihood of rolling off a compressible surface in the stress and strain of an ice rescue in frigid weather. Therefore, the ice rescue craft of the invention is formed of rigid material with a hard faced planar top and bottom, ready to use instantly in an emergency and not subject to puncture or fracture. The craft is elongated and uniformly narrow to permit propulsion by a prone adult either by ice picks, hand applied on each side to the ice, or by kneeling and pushing first with one foot and then the other. The planar bottom spreads the weight of the craft, the rescued and the rescuer, over about 1400 square inches to lessen the possibility of falling through the ice. While narrow, to permit propulsion through snow, and over ice, without undue friction, forward and rearward outriggers which do not contact the ice, prevent the overturn of the craft if it falls into water.

The front and rear end walls are inclined to ride over ice ridges, tin cans, bottles, etc., when propelled in either direction, and the ropes are contained in recesses to avoid loss in an overturn, or fall through.

In the preferred embodiment of the invention the elongated rescue craft of the invention includes a full length, planar, top deck with a recess in each opposite end portion for a recovery line, releasable means for retaining each line in its recess during folding and the two identical halves of the craft are foldable on a piano type hinge to overlie each other in a compact package adapted to fit in the trunk of an automobile.

BRIEF DESCRIPTION OF THE DRAWINGS

FIG. 5 is a front end view of the craft shown in FIGS. 2-4 on a still larger scale;

FIG. 6 is a side elevation, on a reduced scale showing the craft folded and

FIG. 7 is a perspective view of another embodiment of the invention.

DESCRIPTION OF A PREFERRED EMBODIMENT

Figure 1:
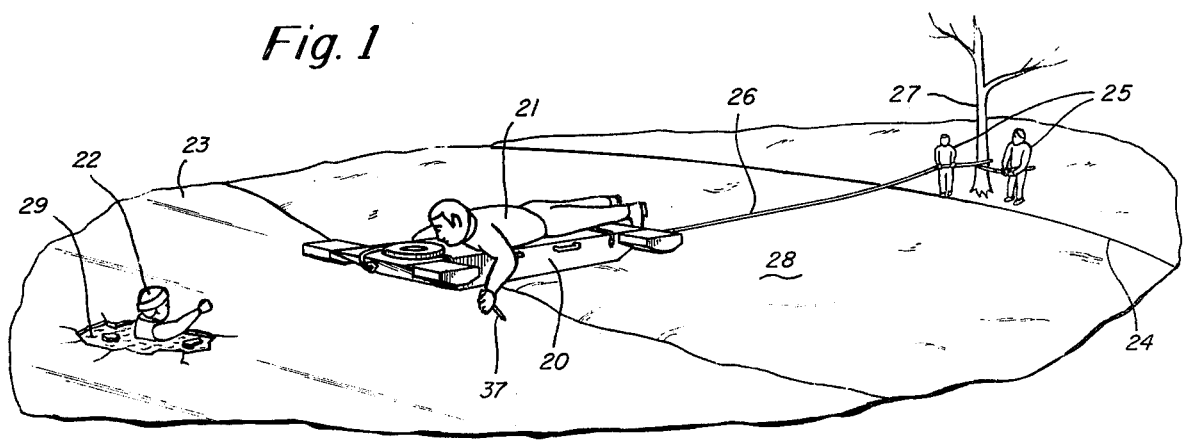
FIG. 1 is a perspective view showing the ice rescue craft of the invention in use.
Figure 2:
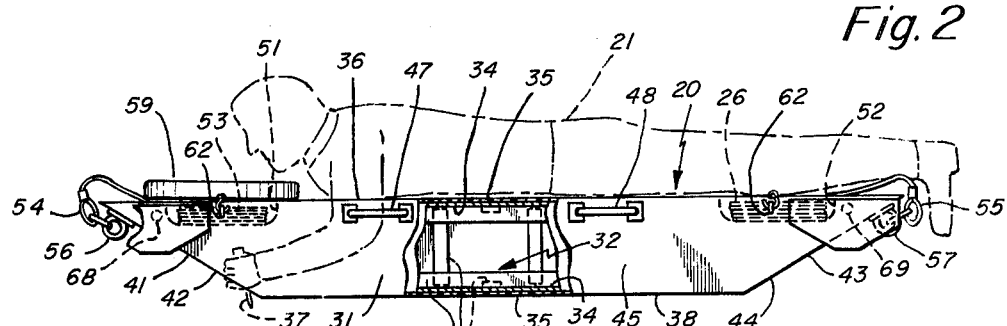
FIG. 2 is a side elevation thereof, on an enlarged scale.
Figure 3:
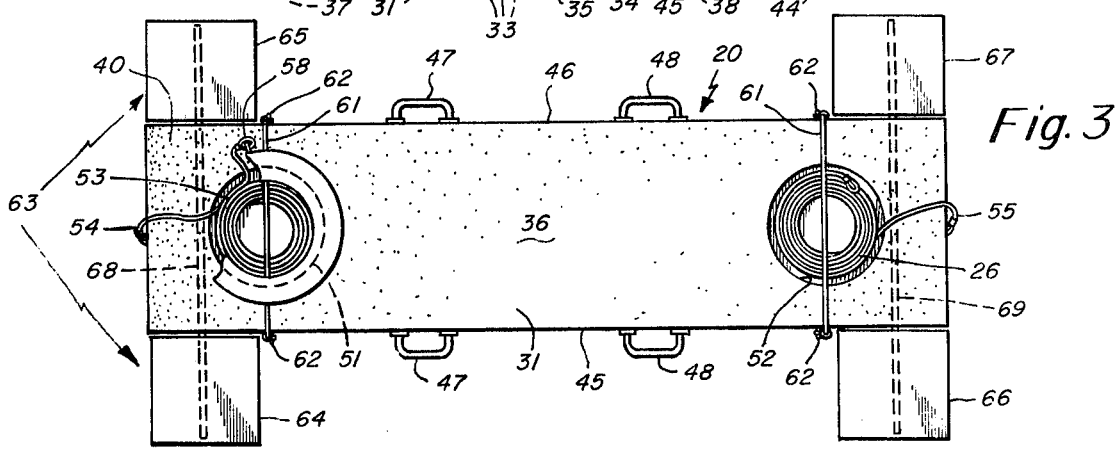
FIG. 3 is a top plan view thereof.
Figure 4:
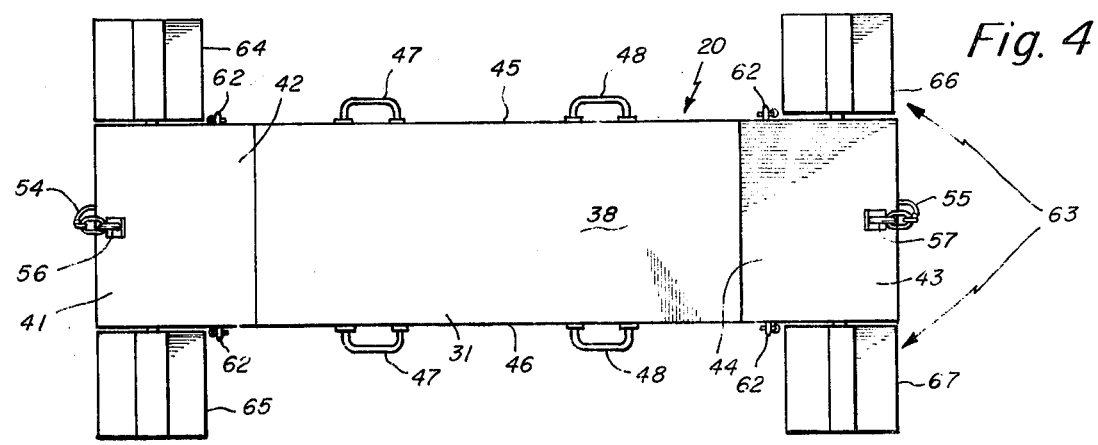
FIG. 4 is a bottom plan view, thereof.

As shown in FIG. 1, the ice rescue craft 20 of the invention differs from recreational boats, floats, toboggans and buoys in being elongated and narrow to support a prone adult 21 and permit the craft to be propelled by ice picks or by a push with the foot. The victim 22 has fallen through thin ice 23 at a distance from shore 24, and rescuers 25 have anchored the rope 26 to the tree 27 while the rescuer 21 propels the craft across the ice 23 or snow covering 28.

The victim usually must be pulled out of the frigid water 29, within fifteen minutes after plunging in or he will probably die of exposure or be so cold as to drown.

It will be noted that fire departments are usually called upon to rescue ice victims and the customary rescue equipment is ladders laid on the ice which are often too short and often too heavy. If a mud scow, or other boat were attempted to be pushed across the ice it is unwieldly, hard to move and has no flat deck upon which the victim can be laid while the rescuer performs mouth to mouth or other resuscitation. Most boats have inclined bottoms so that weight would be concentrated on the parts contacting the ice thereby tending to fracture the ice. If the boat fills with water upon falling through the ice it will fill and have reduced buoyancy while tending to overturn when unbalanced.

Thus the rescue craft 20 has been designed to be extremely light weight to avoid breaking the ice, to spread the weight of the craft with a prone victim and rescuer thereon over the maximum area and yet to float buoyantly and not roll off the occupants into the water in the event of break through.

Rescue craft 20 includes the elongated, narrow, watertight, buoyant body 31 of hard, inflexible material such as the skeletonized frame 32 of wood slats 33 covered with plywood sheeting 34 in turn covered with fibreglass cloth 35. The body 31 includes the elongated, narrow top, or deck 36 which is flat planar and at least as long as a prone adult 21, and not more than about twenty-two inches wide so that the adult 21 may propel the craft with his arms and hands using ice picks 37 in an efficient and rapid manner. As stated above, while not shown, the craft may also be propelled as a sled, or tobaggon, by the adult 21 kneeling thereon and pushing first with one foot and then the other. The top 37 is of hard inflexible material such as wood, because if it were soft, compressible or yieldable the body of the victim 22 and the body of the rescuer 21, lying on the victim to keep him warm and to apply resuscitation, would tend to roll off the craft.

The body 31 also includes the elongated, narrow bottom 38, also of hard inflexible, material such as wood, in order that it not be punctured, fractured or damaged by sharp ice, tin cans, broken bottles or the like. Bottom 38 is a flat and planar bottom to cover at least one thousand square inches, or 22 inches by 54 inches, and preferably about fourteen hundred square inches to spread the forty to seventy pound weight of the craft over the maximum area with minimum pounds per square inch.

The craft 20 is double ended to travel equally well forwardly or rearwardly and is provided with a forward end wall 41, inclined at an angle of about 30° from the ice, at least at the bottom 42 thereof and an identical rearward end wall 43 also so inclined at 44. The 30° angle permits the craft to rise over obstacles and to tend to slide up on the ice once again if it has fallen through the ice and is being pulled to shore by the rescuers 25.

Body 31 includes a pair of vertical side walls 45 and 46, in parallelism each extending between top 36 and bottom 38 and about 10 inches in height, or equal in height to the upper arm of an adult, so that the arms can be used to propel the craft. A pair of handles 47 and 48 are affixed to each side wall so that the craft can be used as a stretcher and to permit persons in the water to grip the same.

A forward, rope-receiving recess 51 or 52 is provided in top 36 to accomodate coiled ropes 53 and 26, one end 54 or 55 of each rope being fixed to one of the eyebolts 56 or 57 in the end walls 41 or 43. The other end 58 of the forward rope 53 is attached to a buoyant life buoy 59.

To retain the coiled ropes 26 and 53 in their respective recesses, a flexible cord 61 extends thereover with each opposite end detachably clipped to suitable eyebolts 62.

Outrigger means 63 is provided on body 31 preferably in the form of a laterally extending, buoyant block, such as 64, 65, 66 or 67, at each forward and rearward corner of the body, the blocks being integral, or being supported by cross bars such as 68 or 69, passing through the body. The blocks are sufficiently forward and rearward as to not interfere with the arms in propelling the device by ice picks, or in propelling the device with swimming arm motions when needed in summer rescues from drowning.

As shown in FIG. 6 the body 31 is preferably foldable in halves to form a compact package for storage or shipment there being a piano type hinge 71 transversely on the centre of top 36 and a pair of latches such as 72 at the level of bottom 38. The latches 72 may be conventional hooks and eyes or may be a double pin member which press fits into suitable holes in the body.

As shown in FIG. 7 the body 31 maybe formed in two identical halves 73, and 74, of foam plastic 75 with a watertight plastic skin 76, there being a hard top deck 77 of dumbell configuration to form the outrigger means 78.

It should be noted that the bottom 79 of the outrigger means 63 and the bottom 81 of outrigger means 78 are both above the plane of the bottom 38 of the craft in order not to retard advance across the snow and ice while still preventing roll over of the body when in the water.

A non-skid surface 40 of ribbed rubber, or of a suitable non-skid, coating is applied to top deck 36.

I claim:

1. An ice rescue craft of the type having an elongated, narrow buoyant body with a flat, planar bottom of hard material, opposite side walls upstanding from said bottom, and forward and rearward end walls inclined upwardly from said bottom in opposite directions, said craft characterized by;

a flat, planar, elongated, narrow top deck on said body, extending from one said side wall to the other and from said forward end wall to said rearward end wall, and including a pair of opposite end portions separated by a central portion at least as long as the body of an adult human being for supporting the same in comfort and without tendency to roll off;

each said opposite end portion of said flat planar top deck having a recess therein for receiving one of a pair of recovery lines;

a pair of said recovery lines, each coiled in one of said recesses and each having one terminal end extending out of said recess and affixed to the adjacent end wall of said body;

said body being formed in two identical halves, each connected to the other by a piano type hinge connection extending transversely across the central portion of said flat planar top deck and by releasable latch means mounted along the lower portion of said upstanding side walls proximate the level of said bottom;

said two identical halves being foldable into a compact package with the top deck of one half flatwise against the top deck of the other half without interference during folding from said coils or recovery line.

2. An ice rescue craft as specified in claim 1, including:

outrigger means extending outwardly from each opposite side of each opposite end portion of said top deck, said outrigger means having bottoms spaced above the plane of the bottom of said craft in order not to retard advance across snow and ice while still preventing roll over of the craft in the water.

* * * * *